(12) United States Patent
Mehta et al.

(10) Patent No.: US 7,831,594 B2
(45) Date of Patent: Nov. 9, 2010

(54) ESTIMATING THE STATIC EXECUTION TIME OF A DATABASE QUERY

(75) Inventors: Abhay Mehta, Austin, TX (US); Chetan Kumar Gupta, Austin, TX (US); Umeshwar Dayal, Palo Alto, CA (US)

(73) Assignee: Hewlett-Packard Development Company, L.L.P., Houston, TX (US)

( * ) Notice: Subject to any disclaimer, the term of this patent is extended or adjusted under 35 U.S.C. 154(b) by 382 days.

(21) Appl. No.: 11/799,141

(22) Filed: Apr. 30, 2007

(65) Prior Publication Data
US 2008/0270346 A1    Oct. 30, 2008

(51) Int. Cl.
*G06F 17/30* (2006.01)

(52) U.S. Cl. .................... 707/721; 707/720
(58) Field of Classification Search ............. None
See application file for complete search history.

(56) References Cited

U.S. PATENT DOCUMENTS 6,026,391 A * 2/2000 Osborn et al. .................. 707/2
7,184,998 B2 * 2/2007 Nica .............................. 707/2

* cited by examiner

*Primary Examiner*—Baoquoc N To

(57) ABSTRACT

In a method for estimating a static execution time of a database query, a prediction of query runtime tree is built from historical query information. A database query is received. The prediction of query runtime tree is used to estimate the static execution time of the database query.

13 Claims, 5 Drawing Sheets

---

500

RECEIVING A DATABASE QUERY.
510

↓

ACCESSING A PREDICTION OF QUERY RUNTIME TREE BUILT FROM HISTORICAL QUERY INFORMATION.
520

↓

PROCESSING THE DATABASE QUERY THROUGH THE PREDICTION OF QUERY RUNTIME TREE TO ESTIMATE A STATIC EXECUTION TIME OF THE DATABASE QUERY BASED UPON HISTORICAL INFORMATION PERTAINING TO HISTORICAL DATABASE QUERIES SIMILAR TO THE DATABASE QUERY.
530

400

BUILDING A PREDICTION OF QUERY RUNTIME TREE FROM HISTORICAL QUERY INFORMATION.
410

↓

RECEIVING A DATABASE QUERY.
420

↓

UTILIZING THE PREDICTION OF QUERY RUNTIME TREE TO ESTIMATE THE STATIC EXECUTION TIME OF THE DATABASE QUERY.
430

ESTIMATING THE STATIC EXECUTION TIME OF A DATABASE QUERY

TECHNICAL FIELD

Embodiments of the present technology relate to database information. More specifically, embodiments of the present technology relate to using historical query information in estimating the static execution time of a database query.

BACKGROUND

An optimizer is located in or is part of a compiler of a database. Generally speaking, the optimizer compiles a received query into a plan, called a plan of execution. The optimizer then examines several different potential plans of execution for each query. For each of the examined plans the optimizer generates a cost based upon a costing model internal to the optimizer, so that it can choose the plan with the least amount of cost as the means for executing the query.

The execution cost is typically determined in a very analytical way. Generally speaking, the optimizer divides a database query into its operations and sub-operations, and determines from a cost model how many resources will be used to execute each operation and sub-operation. The optimizer then determines a sum of these incremental execution costs to determine the overall execution cost for a query. The execution cost is typically a unitless number which represents a cost in terms of resource utilization. Generally, the optimizer chooses an execution plan with the lowest calculated execution cost. Though not guaranteed, one goal of this selection method is that an execution plan with a lower execution cost will likely execute the database query more quickly than an execution plan with a higher execution cost.

User's typically desire some estimate of the time that it will take for a query, not just a goal that one query plan will likely execute more quickly than another. There are a variety of reasons for this. For example, by having an estimate of the query time, a user (or a system) can more effectively manage the workload of a database. That is, decisions can be made such as: how many queries to perform at once; what order the queries should be performed in; and how to load balance the database system. Additionally, if a user knows that a query will take a long time, he may take an action, such as: reformatting the query, not executing the query, or deciding to do something with his time while the query is executing. Thus, the more accurate an estimate is, the better it can be utilized for planning and managing purposes Currently, the numerical value of the execution cost, as estimated by the optimizer, is the main means used for estimating the execution time for a database query. However, while the execution cost is a fairly accurate predictor of relative execution cost (in terms of resource utilization costs) for choosing among a variety of execution plans, it is not an accurate mechanism for estimating the time that a particular query is likely to take to execute. Generally speaking, execution times estimated from an execution cost are not very reliable and typically often vary widely when compared to actual execution times. This causes difficulties when using such an estimation of execution time in management of database workload and/or in user decisions with respect to database queries.

BRIEF DESCRIPTION OF THE DRAWINGS

The accompanying drawings, which are incorporated in and form a part of this specification, illustrate embodiments of the present technology for estimating the static execution time of a database query and, together with the description, serve to explain principles discussed below:

FIG. 4 is a flow diagram of an example method for estimating the static execution time of a database query, according to one embodiment.

Figure 1:
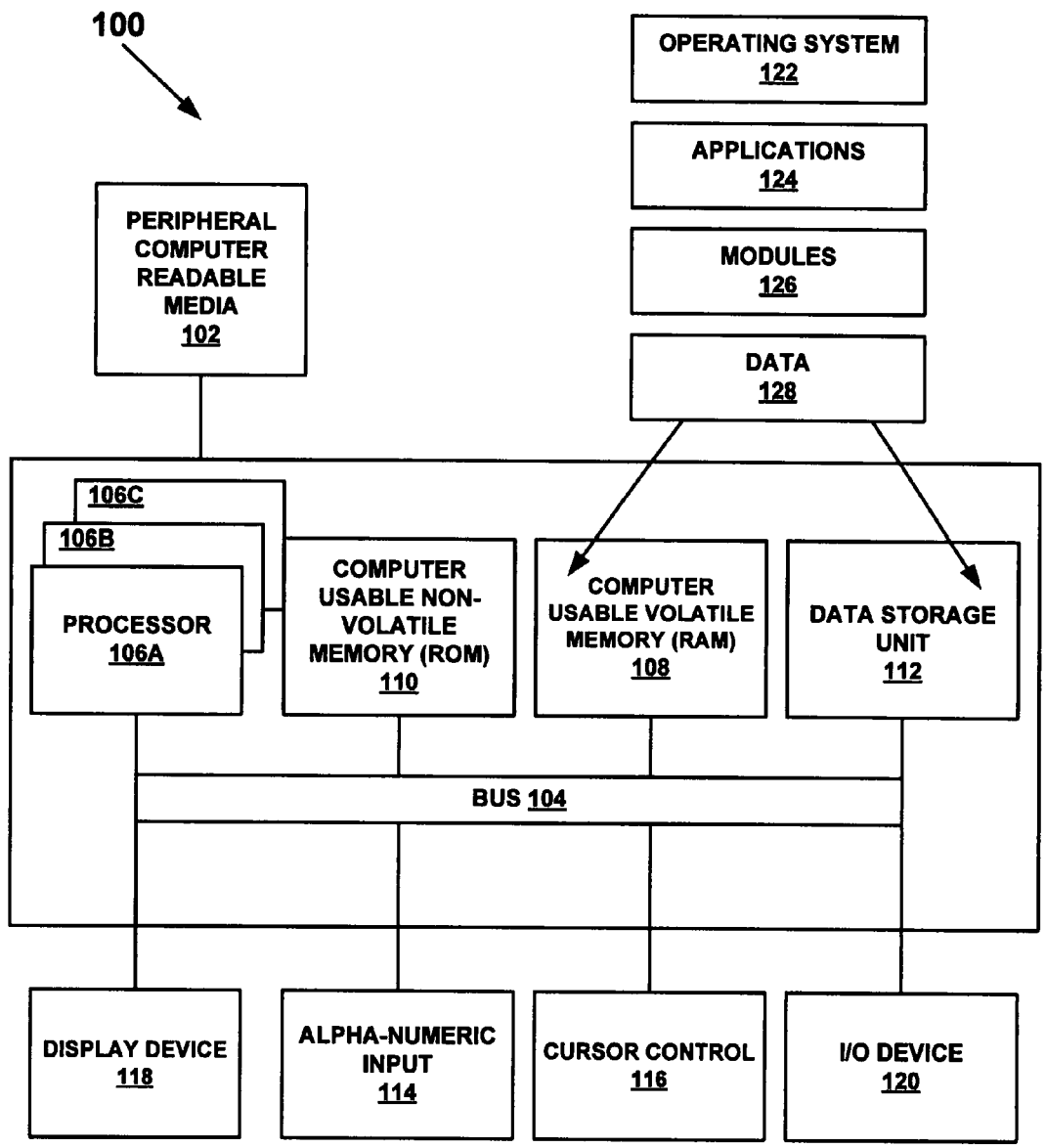
FIG. 1 is a diagram of an example computer system used in accordance with embodiments of the present technology.

The drawings referred to in this description should not be understood as being drawn to scale unless specifically noted.

DETAILED DESCRIPTION

Reference will now be made in detail to embodiments of the present technology for estimating a static execution time of a database query, examples of which are illustrated in the accompanying drawings. While the subject matter is described in conjunction with various embodiments, it will be understood that they are not intended to limit the present technology to these embodiments. On the contrary, the present technology is intended to cover alternatives, modifications and equivalents, which may be included within the spirit and scope the various embodiments as defined by the appended claims. Furthermore, in the following detailed description, numerous specific details are set forth in order to provide a thorough understanding. However, the present technology may be practiced without these specific details. In other instances, well known methods, procedures, components, and circuits have not been described in detail so as not to unnecessarily obscure aspects of the subject matter being described.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the described arts to most effectively convey the substance of their work to others skilled in their art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "building", "receiving", "accessing", "utilizing", "decomposing", "grouping", "terminating", "including", "traversing", "processing", "developing, or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Overview of Discussion

The present technology utilizes a data mining approach in combination with a binary decision tree to estimate the static execution time of a database query before the query starts executing. As will be seen, the estimation may take one or both of two forms. Firstly, the estimate may be a given range of times, and secondly, the estimate may be a particular time. In the first instance (the given range of times), the accuracy of the estimate (likelihood that it will fall within the given range) is greater than the accuracy of a particular time estimate. Thus, if the user is willing to sacrifice some amount of accuracy, an estimate can be narrowed from a broader time range estimate a narrower time range estimate through the use of a binary decision tree (often the time range estimate can be successively narrowed several times in this manner, with each successive narrowing resulting in some decrease in the accuracy of the estimate). Additionally, if a user is willing to sacrifice some accuracy, an estimate can also be narrowed from a time range estimate to a particular time estimate through the use of multiple linear regression techniques on selected historical query information.

Discussion will begin with a description of an example computer system environment with which, or upon which, embodiments of the present technology may operate. Discussion will proceed to a description of an example system for estimating a static execution time of a database query. Components of this system will be generally described. Operation of the system and its components will then be described in conjunction with description of an example method for estimating the static execution time of a database query, and further with description of a method for utilizing historical information to estimate a static execution time of a database query. An example of a binary decision tree called a prediction of query runtime (PQR) tree will be discussed in conjunction with the description of these methods in order to promote the understanding of the present technology.

Example Computer System Environment

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example, and that the present technology can operate on or within a number of different computer systems including general purpose networked computer systems, embedded computer systems, optical computer systems, virtual computer systems, database systems, server devices, client devices, various intermediate devices/nodes, stand alone computer systems and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multiprocessor environment in which a plurality of processors 106A, 106B, and 106C are present. Conversely, system 100 is also well suited to having a single processor such as, for example, processor 106A. Processors 106A, 106B, and 106C may be any of various types of microprocessors.

System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108, computer readable media within data storage unit 112, and/or peripheral computer readable media 102.

System for Estimating a Static Execution Time of a Database Query

Figure 2:
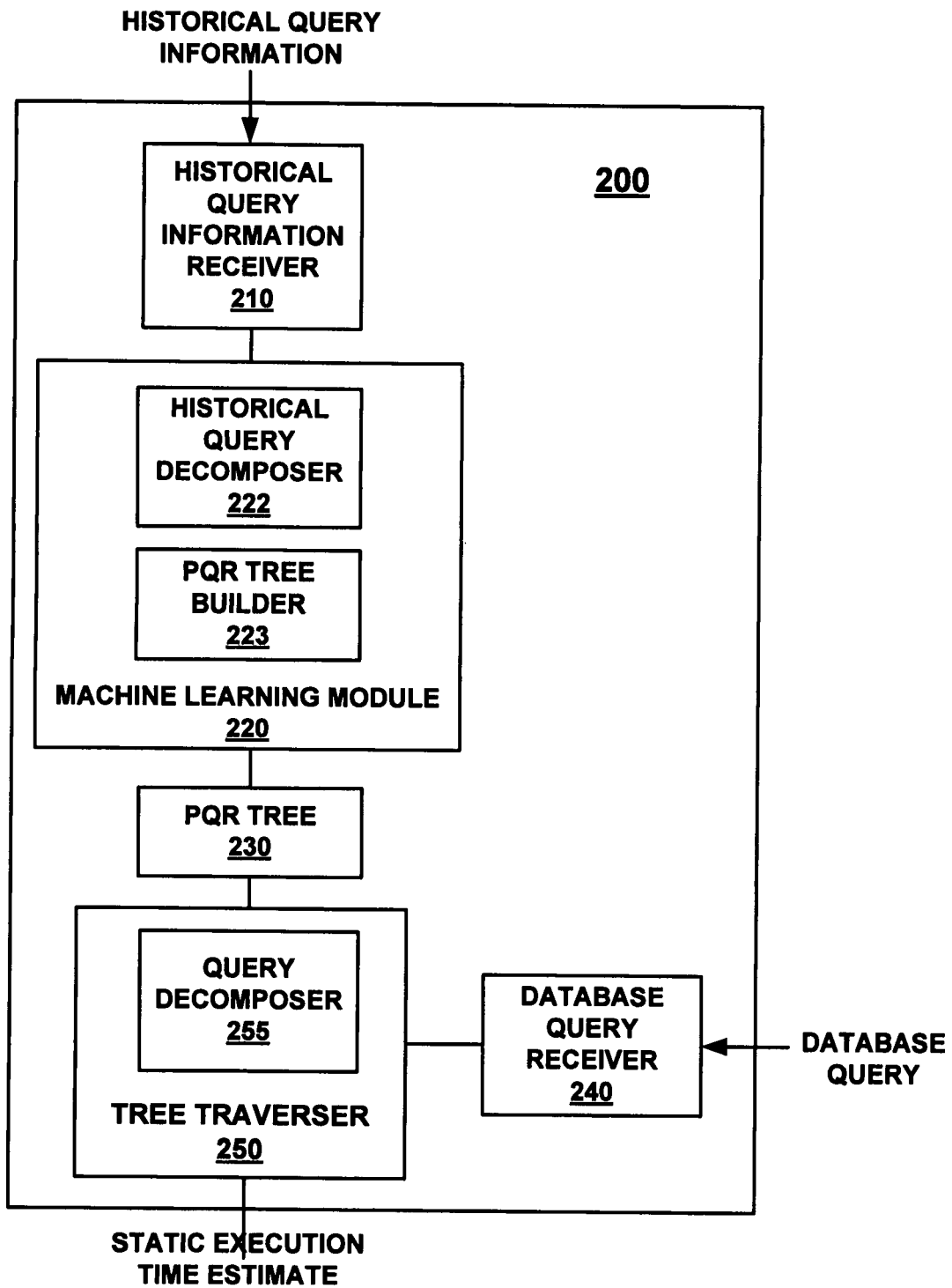
FIG. 2 is a block diagram of an example system for estimating a static execution time of a database query, according to various embodiments.

With reference now to FIG. 2, a block diagram is shown of a system 200 for estimating a static execution time of a database query. It is appreciated that system 200 illustrates one example embodiment, and that other configurations within the scope of the present technology are possible. As shown in FIG. 2, system 200 is comprised of an historical query information receiver 210, a machine learning module 220, a prediction of query runtime (PQR) tree 230, a database query receiver 240, and a tree traverser 250.

Historical query information receiver 210 is configured for receiving historical query information to be processed by machine learning module 220 into a PQR tree, such as PQR tree 230. Such historical information may comprise a set of database queries, corresponding database query plans which have been run on a particular database system, and corresponding actual execution times of said queries. For example, the historical information may comprise the set of queries and/or corresponding query plans run on a database during the past week, month, year, or some other time interval. It is appreciated that in some embodiments the historical query information may be updated or changed periodically, such as weekly or monthly.

Machine learning module 220 is coupled with historical query information receiver 210. Machine learning module 220 is configured for automatically developing query execution time rules from the historical query information supplied by historical query information receiver 210. These query execution time rules are then embodied by (within the structure of) a prediction of query runtime tree, such as PQR tree 230. In one embodiment, as shown in FIG. 2, machine learning module 220 is comprised of historical query decomposer 222 and PQR tree builder 223.

Machine learning module 220 utilizes historical query decomposer 222 for decomposing an historical database query into at least one historical query feature related to an historical database query. As part of this decomposition, historical query decomposer 222 parses an historical database query and/or a query plan corresponding to the historical database query. During the parsing, the historical database query and/or historical query plan are decomposed into one or more pre-identified query features that historical query decomposer 222 has been instructed to search for. A non-limiting example list of some such query features includes: an optimizer cost, a total number of operators, a total operator cost, a total operator cardinality, a total number of tables, a measure of bushiness of a query tree, a measure of process parallelism, a total number of joins, a total join cardinality, a total number of group-bys and sorts, a total cardinality of group-bys and sorts, a total number of input/outputs, a total input/output cardinality, and an accuracy of table statistics.

With respect to this example list of query features, the following query feature descriptions apply.

An optimizer cost represents the execution cost provided by a database optimizer, for example as part of a query plan.

The total number of operators corresponds to the summation of the operators that comprise a particular database query.

The total operator cost corresponds to the summation of the individual operator costs of each operator within a particular database query. Such information may be parsed from a query plan associated with a particular database query.

Total cardinality corresponds to the number of or records processed by a particular historical database query. Thus for each operator in a database query, the number of records processed is summed to determine total cardinality.

Total number of tables corresponds to the sum of the number of tables accessed by a particular database query.

Bushiness of query tree corresponds to the query tree developed by a database optimizer as part of a query plan corresponding to a database query. Bushiness is a ratio that is a measure of how many leaves are in such a query tree. For example, is the query tree a straight line or does it have a large number of nodes and leaves. Each node in a query plan can have one child or two children. Bushiness of the query tree is determined in one embodiment, by taking a ratio of the number of nodes that have two children divided by the total number of nodes. This ratio gives a measure of the bushiness.

Process parallelism corresponds to the number of parallel processes spawned by a database query. Each operator can spawn a number of processes to conduct work more quickly. By adding up the number of parallel processes that an operator divides it self into, a measurement of process parallelism is achieved.

Total number of joins corresponds to the sum of the number of joins between tables (and/or within a single table) that are contained in a database query.

Total join cardinality corresponds to the number of entries in the joined tables that are joined by a database query.

Total number of group-bys and sorts corresponds to the sum of the number of "grouping" and "sorting" operations performed by a database query.

Total group-by and sorts cardinality corresponds to the number of items in a table or list of items that is being grouped or sorted by a database query. Thus in an instance where a list of 100 names is being sorted, the sorting cardinality is 100. Thus, the total of items in all tables being grouped-by or sorted by a database query gives the total group-by and sorts cardinality.

Total number of input/output operations corresponds to the total number of storage accesses to be performed by operations in a database query.

Total input output cardinality corresponds to the number of records retrieved during the input/output operations performed by operations of a database query.

Accuracy of table statistics refers to the accuracy of statistics about a table as compared to the actual data of a table. Typically, a query optimizer stores data about a table, such as the size of the table. As data comes in and goes out of a table, data about the table changes, but the optimizer doesn't know this, because it doesn't update the statistics of the table on a constant basis. Thus, the accuracy of table statistics refers, in one embodiment, to the percentage of table statistics which are correct as compared to actual table properties.

With continued reference to FIG. 2, PQR tree builder 223 works in conjunction with historical query decomposer 222, and in one embodiment is coupled with historical query decomposer 222. PQR tree builder 223, groups an historical database query into an element (such as a node and/or a leaf) of a binary decision tree based upon an execution runtime of the historical database query. Thus, for example, all historical database queries that fall within a certain time range, such as two seconds to five seconds to execute, will be grouped together.

TABLE 1

Example Definition of a PQR tree $T_s$
A PQR Tree, denoted by $T_s$, is a binary tree such that:

(1) Every node u of $T_s$ is some 2-class classifier $f_u$.
(2) The node u contains examples on which the classifier $f_u$ is trained.
(3) Every node and leaf of the tree corresponds to a time range $[t_{ua}, t_{ub}]$.
(4) $f_u$ is a rule that decides for each new query q with execution time $t_q$ in $[t_{ua}, t_{ub}]$, if q should go to $[t_{ua}, t_{ub} + \Delta_u)$ or $[t_{ua} + \Delta_u, t_{ub}]$, where $\Delta_u$ lies in $(0, t_{ua} - t_{ub})$.
(5) Every leaf contains a multiple linear regression function for prediction of precise time values.

A PQR tree, such as PQR tree 230 is designed to comply with certain objectives which are predefined. Table 1, shows a definition used, for example by PQR tree builder 223 during the building of a PQR tree.

Figure 3:
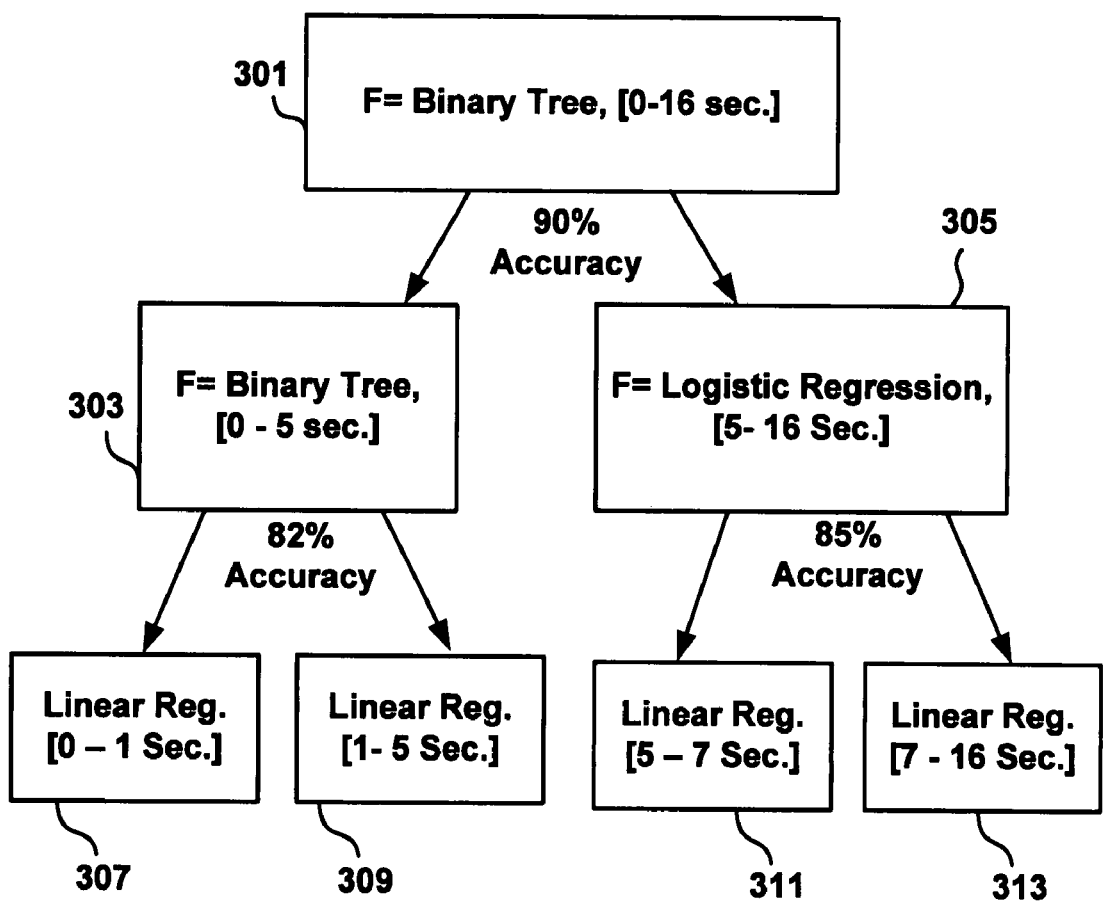
FIG. 3 represents an example prediction of query runtime tree, according to an embodiment.

An example of a very basic PQR tree 230A is shown FIG. 3. PQR tree (Prediction of Query Runtime) tree 230A represents a database query time estimator solution set for a given database system, and is based upon a given set of historical database information. In one embodiment, PQR tree 230A is created by machine learning module 220.

Database query receiver 240 is configured for receiving a database query for which the static execution time will be estimated. This may also comprise receiving an execution plan for the database query. The execution plan will have been designed by the optimizer of the database system for which PQR tree 230 has been built to estimate database query times.

Tree traverser 250 is coupled with database query receiver 240. Tree traverser 250 processes a received database query through a PQR tree, such as PQR tree 230, to estimate a static execution time of the database query based upon historical information pertaining to execution times of historical database queries with similar query features to the query features of the received database query. By static execution time, what is meant is the time needed to execute the received database query on an unloaded database system that is not processing another database query.

Figure 5:
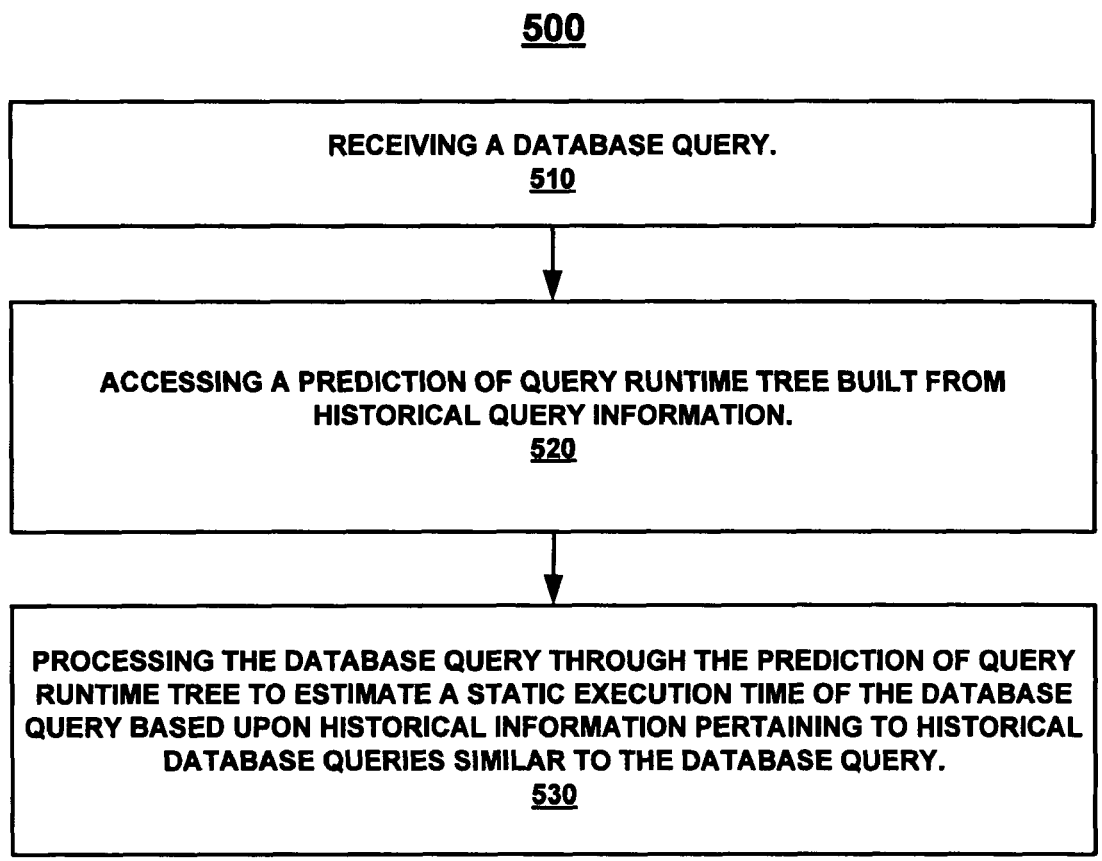
FIG. 5 is a flow diagram of an example method for utilizing historical query information to estimate the static execution time of a database query, according to an embodiment.

Operation of the Present System for Estimating a Static Execution Time of a Database Query The following discussion sets forth in detail the operation of present technology through description of example embodiments. With reference to FIGS. 4 and 5, flow diagrams 400 and 500 each illustrate example steps used by methods and/or processes according to various embodiments described herein. Flow diagrams 400 and 500 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 400 and 500 such steps are examples. It is appreciated that embodiments described herein are well suited to performing various other steps or variations of the steps recited, that the recited steps may be performed in an order different than presented, and that not all of the recited steps may be performed in every embodiment.

Method for Estimating a Static Execution Time of a Database Query

FIG. 4 is a flow diagram 400 of a method, according to one embodiment, for estimating a static execution time of a database query. Reference will be made to elements of FIG. 2 and FIG. 3 to facilitate explanation of the operation of flow diagram 400.

At 410 of flow diagram 400, in one embodiment a prediction of query runtime tree is built from historical query information. In one embodiment this comprises utilizing machine learning to build the prediction of query runtime tree such that node elements and leaf elements of the prediction of query runtime tree correspond to estimated execution time ranges. For example, in one embodiment, system 200 of FIG. 2 utilizes data machine learning module 220 and its components, historical query decomposer 222 and PQR tree builder 223, to automatically build a PQR tree, such as PQR tree 230A shown in FIG. 2, from historical database information.

With reference to PQR tree 230A of FIG. 3, in one embodiment, PQR tree builder 223, groups an historical database query into an element (such as a node and/or a leaf) of a binary decision tree based upon an execution runtime of the historical database query. Thus, for example, all historical database queries that fall within a certain time range, such as two seconds to five seconds to execute, will be grouped together. Information about the query features of such grouped historical database queries is also stored in the element of the PQR. This facilitates comparison of one or more query features of a database query being processed to one or more query features of the grouped historical database queries. For example, PQR tree builder 223 may store a query feature based branching rule in a node 303 that says: if a processed database query contains more that 10 joins, then branch to leaf 307, otherwise proceed to leaf 209.

Such a branching rule, or classifier, may be expressed in many ways within a node of a PQR tree. For example, in one embodiment, such a branching rule may be incorporated in a logistic regression function used for determining a binary branching path from a node. In another embodiment, such a rule may be incorporated into a binary decision tree for determining a branching path from a node. It is appreciated that a node may posses one such query feature based rule or a plurality of such query feature based rules which are together utilized to determine a branching path for a database query being processed through a PQR tree. It is also appreciated that other classifiers besides these examples may be utilized within a node of a PQR tree.

In one embodiment, the process of utilizing machine learning to build the PQR tree comprises decomposing an historical database query of the historical query information into an historical query feature. As previously described, historical query decomposer 222 decomposes historical database queries by searching for one or more predefined query features. A non-limiting example list of such query features includes: an optimizer cost, a total number of operators, a total operator cost, a total operator cardinality, a total number of tables, a measure of bushiness of a query tree, a measure of process parallelism, a total number of joins, a total join cardinality, a total number of group-bys and sorts, a total cardinality of group-bys and sorts, a total number of input/outputs, a total input/output cardinality, and an accuracy of table statistics. It is appreciated that more, less, or other query features may be decomposed from an historical database query in some embodiments.

In one embodiment, while building a prediction of query runtime tree from historical query information, PQR tree builder 223 groups one or more historical database queries of the historical query information into an element of a binary decision tree based upon an execution time of the historical database query. This grouping is based upon a rule which is applied to affect the split of a broader time interval (the range of time between the execution time of the shortest historical database query to the longest execution time for an historical database query) into two or more narrower time intervals. For example, in one embodiment, if node 301 of PQR tree 230A has 100 historical database queries, then the 50 shortest queries go into the left sub-node (node 303) and the 50 largest queries go into the right sub-node (node 305). The basic idea here is that all the historical database queries in a node are split into two sets of equal number of queries. The time span between the shortest execution time in a split group and the longest execution time in the split group represents the time range associated with the element (node or leaf) of the PQR tree in which the split group queries is stored. This splitting can be continued to build out additional nodes and/or leaves the PQR tree. In general, unless it is part of the splitting rule or a termination rule (discussed below), it is not important how many queries are placed into each group. Likewise the number of database queries in the set of historical information is not of great significance.

In some instances one or more additional rules may govern splitting of historical database queries into smaller groups. For example, in one embodiment, there exists a rule that at least a certain number of historical database queries will be grouped within an element (node or leaf) of a PQR tree. For instance, in one embodiment, such a number may be 20 queries minimum per leaf or node. With reference to FIG. 3, in such an example, each leaf (307, 309, 311, 313) will store at least 20 queries.

In one embodiment PQR tree builder 223 terminates construction of a particular element of a PQR tree based upon a pre-defined termination condition. Thus, as PQR tree builder 223 builds out nodes and leaves of a PQR tree, building is terminated when a termination condition is met. One example of a termination condition is dropping below a predetermined threshold number of historical database queries grouped in an element. Following the previous example, if only 19 historical database queries were available to store in a leaf node of PQR tree 230A, the leaf node would not be added. Another example of a termination condition is when the time range threshold for an element drops below a certain pre-determined time range threshold. For example, if a pre-determined threshold of 5 seconds was established as a termination condition, leaf 307 and leaf 309 of PQR tree 230A would not be built. Yet another example of a termination condition is when the accuracy of estimation of execution time falls below a predetermined accuracy of time estimation for an element. Thus, for example, if the accuracy cut-off was established 83%, node 303 of PQR tree 230A would not be built.

As previously indicated, PQR tree 230A represents a database query time estimator solution set for a given database system, based upon a given set of historical database information. Consider, for example, a given set of historical information comprised of historical information related to 100 historical database queries. In one embodiment, machine learning module 220 would parse a certain number of the historical database queries such as 80%, to build PQR tree 230A. The remaining historical database queries, 20% in this example, would be used as a test set to perform testing upon PQR tree 230A to determine how accurately it operates to estimate database query execution times. This is a mechanism for building a PQR tree and then validating its operation prior to its first actual use. Thus, if issues are found based upon processing the test set, they can be corrected or addressed prior to using the PQR tree to process a non-historical database query.

As can be seen, each node (310, 303, 305) and leaf (307, 309, 311, 313) of PQR tree 230A is a classifier which represents a time range. For example initial node 310 represents a time range of zero to sixteen seconds. Subsequent elements (nodes and leaves) below initial node 310 further subdivide portions of this time range. It is appreciated that a PQR tree, such as PQR tree 230A is obtained a-priori by applying machine learning to data collected during normal runs on a database system, and can be updated as and when desired. As previously described, collected data is used to define the classification rules in the tree. Whenever a new database query is received, it traverses the PQR tree to be classified into an estimated execution time range associated with a leaf of the PQR tree. As previously described, historical database queries are grouped, by PQR tree builder 223, according to their respective execution times into a node and/or leaf with an execution time range corresponding to the execution time of the historical database query. Thus, for example, node 303 contains a grouping of historical database queries which had execution times in the range of zero to five seconds.

Additionally as can be seen in FIG. 3, each node of PQR tree 230A utilizes a particular manner to express a query feature based rule, or classifier, for a database query being classified. Thus, in one embodiment, building a PQR tree from historical query information comprises including a decision making function, such as a classifier, in a node element of the PQR tree. Such a decision making function is for classifying a database query into one of two leaves coupled with a particular node. For example, node 305 of PQR tree 230A uses logistic regression function used for determining a binary branching path from node 305 to either leaf 311 or leaf 313; node 301 uses a binary decision tree for determining a branching path to either node 303 or node 305; and node 303 uses a binary decision tree to determine a branching path to leaf 307 or leaf 309. It is appreciated that a node may posses one such query feature based rule or a plurality of such query feature based rules which are together utilized to determine a branching path for a database query being processed through a PQR tree.

Moreover, based upon analysis of the set of historical database information, each node is associated with an accuracy level. In PQR tree 230A, this is expressed as a percentage, associated with how accurately the historical database queries of the set comply with the time range associated with the node when the historical database queries utilized to build PQR tree 230A are later processed through PQR tree 230A. Thus, as shown in FIG. 3, an accuracy of 90% is associated with node 301, an accuracy of 82% is associated with node 303, and an accuracy of 85% is associated with node 305.

Also, as shown in FIG. 3, each leaf of PQR tree 230A applies linear regression (or more specifically multiple linear regression) to query features of queries that are grouped into a time range corresponding to the time range represented by the leaf. Thus, in one embodiment, building a prediction of query runtime tree from historical query information comprises including a multiple linear regression function in a leaf element of the prediction of query runtime tree. The multiple linear regression function is for determining the static execution time for a database query processed to this leaf of the PQR tree. Using linear regression applied to one or more identified query features in the grouping of historical database queries that is/are similar to query features of a database query being, a particular execution time for the database query to be estimated. This is because such linear regression allows the database query can be most closely compared to historical database queries that it is most similar to, and is therefore most likely to share a similar execution time with.

At 420 of flow diagram 400, in one embodiment, a database query is received for which a static execution time will be estimated. This comprises receiving a database query and/or query plan information corresponding to the database query. For example, the database query is a query for the database system for which system 200 has built a PQR tree.

At 430 of flow diagram 400, in one embodiment, the prediction of query runtime tree is utilized to estimate the static execution time of the received database query. In one embodiment, this comprises tree traverser 250 processing the received database query through a PQR tree, such as PQR tree 230 to estimate the static execution time for the query.

For example, with reference to PQR tree 230A of FIG. 3, for any received database query, tree traverser 250 applies rule $f_u(q)$ at every node u of query tree 230A, starting at initial node 301. This allows a decision to be made about which child node the database query (q) is classified to, and also allows the accuracy of the estimated execution time to be calculated. For example, the database query may be classified as branching in a particular direction from a node based upon a query feature such as its bushiness being above a certain value. As the database query is processed through PQR tree 230A, this type of classification is used to continually classify the database query based upon one or some combination of query features associated with the database query.

For example, this type of feature based classification is performed at each particular node which is traversed by means of a classification rule or rules, until a leaf node of PQR tree 230A is reached. At the leaf node, an estimated execution time range associated with the leaf node can be provided, and/or through linear regression a particular estimated execution time can be determined. Thus, through such traversing of the PQR tree on the basis of at least one query feature associated with the received database query, a rough estimate of the static execution time in the form of a time range estimate of the static execution time is associated the database query based upon a similarity of at least one query feature to a historical query feature shared by a grouping of historical database queries. It is appreciated that as each node and leaf of a PQR tree is traversed, the time range estimate for execution time is successively narrowed.

Thus, for example, when traversing PQR tree 230, an initial broad estimate of execution time (0 to 16 seconds) is obtained at node 301. Based upon a binary tree classification rule, a path to either node 303 or 305 is chosen. Upon traversing the tree either to node 303 or node 305, the broad time range estimate of node 301 will be narrowed to the time range estimate associated with either node 303 or node 305, depending on the path traversed. Assuming that a query is classified such that the path no node 305 is traversed, the time range associated with node 303 (0 to 5 seconds) can be narrowed again by a logistic regression classification rule which chooses either the path to leaf 311 or leaf 313. If for example, logistic regression indicates that the path to leaf 313 should be traversed, then the estimated time range is narrowed to the time range associated with leaf 313 (7 to 16 seconds).

Additionally, a more specific, though less accurate particular estimate of the execution time may be made at the destination leaf by performing multiple linear regression upon the stored historical database queries of the destination leaf. This compares the query features of a database query being analyzed to the query features of the stored historical database queries to determine similarities between the historical database queries and the database query being analyzed. Consider the previous example where PQR 230A tree was traversed to leaf 313 to determine an estimated execution time range for a database query. A particular time in the range of 5 to 7 seconds can additionally be estimated by performing multiple linear regression to compare the features of the database query with query features of historical database queries stored in (or associated with) leaf 313. Thus, for example, a particular time estimate of 8.42 seconds may be determined by means of such multiple linear regression. In one embodiment, the particular estimate is automatically provided, while in another embodiment, it is provided if requested by a user input.

In one embodiment, an estimate of static execution time (a time range, particular estimate, or both) is then output to a user, for example on a display device, such as display device 118 (FIG. 1). In another embodiment, the static execution time estimate (a time range, particular estimate, or both) is output to be used by another process, such as for use by a portion of a database system.

To determine the query features associated with the received database query, in one embodiment, tree traverser 250 utilizes query decomposer 255 to decompose the received database query (and/or the query plan associated with the database query) into one or more query features. Query decomposer 255 operates in the same fashion as historical query decomposer 222 to parse the received database query and/or its corresponding query plan. During the parsing, the database query and/or corresponding query plan are decomposed into one or more pre-identified query features that query decomposer 255 has been instructed to search for. These are typically the same query features that historical query decomposer 222 has been instructed to parse for in historical query information. A non-limiting list of some such query features includes: an optimizer cost, a total number of operators, a total operator cost, a total operator cardinality, a total number of tables, a measure of bushiness of a query tree, a measure of process parallelism, a total number of joins, a total join cardinality, a total number of group-bys and sorts, a total cardinality of group-bys and sorts, a total number of input/outputs, a total input/output cardinality, and an accuracy of table statistics. With respect to this example list of query features, it is appreciated that more, less, or other query features may be decomposed from a database query in some embodiments.

Method for Utilizing Historical Query Information to Estimate a Static Execution Time of a Database Query FIG. 5 is a flow diagram 500 of a method, according to one embodiment, for utilizing historical query information to estimate a static execution time of a database query. Reference will be made to FIG. 2, FIG. 3, and elements of flow diagram 400 of FIG. 4 in the explanation of flow diagram 500.

At 510 of flow diagram 500, in one embodiment, a database query is received. Additionally, in some embodiments, this comprises receiving a database query and/or query plan information corresponding to the database query. As previously described in conjunction with 420 of flow diagram 400, this comprises database query receiver 240 receiving a database query for which a static execution time will be estimated. It is appreciated that the received database query is a query for the database system for which a PQR tree, such as PQR tree 230A (FIG. 3) has been built.

At 520 of flow diagram 500, in one embodiment, a prediction of query runtime tree built from historical query information is accessed. In one embodiment, this comprises accessing a PQR tree such as PQR tree 230A. For example, as previously described, in one embodiment, this comprises tree traverser 250 accessing an initial node (e.g., node 301) of a binary decision tree such as PQR tree 230A. This initial node corresponds to an overall range of historical execution times associated with plurality of historical database queries of the historical information which are stored within the PQR tree. Thus, with reference to node 301 of PQR tree 230A, the time range of node 301 (and correspondingly PQR tree 230A) is zero to sixteen seconds. This time range is related to the range between the shortest execution time and the longest execution time of historical database queries stored within or embodied by PQR tree 230A.

At 530 of flow diagram 500, in one embodiment, the received database query is processed through the prediction of query runtime tree to estimate a static execution runtime of the database query based upon historical information pertaining to historical database queries similar to the received database query. In one embodiment, tree traverser 250 instigates or performs this processing though a PQR tree, such as PQR tree 230A of FIG. 3.

As part of processing the database query through PQR tree 230A, in one embodiment, the query is decomposed into one or more query features. In one embodiment, this comprises tree traverser 250 utilizing query decomposer 255 to decompose a received query into one or more pre-identified query features. A non-limiting list of some such query features includes: an optimizer cost, a total number of operators, a total operator cost, a total operator cardinality, a total number of tables, a measure of bushiness of a query tree, a measure of process parallelism, a total number of joins, a total join cardinality, a total number of group-bys and sorts, a total cardinality of group-bys and sorts, a total number of input/outputs, a total input/output cardinality, and an accuracy of table statistics.

As previously described in conjunction with step 430 of flow diagram 400, in one embodiment, the PQR tree is traversed based upon successive classification of the received database query according to a classification rule (or rules) at each node of the PQR tree. Such classification rule(s) are based upon historical query features common to historical database queries that are grouped at a particular node. These historical query features are compared in some manner, such as, for example, by a binary tree or logistic regression, to one or more query features of the received database query. This allows the determination of branching paths while traversing a PQR tree to process a received database query. Thus, in this manner, the PQR tree is traversed on the basis of at least one query feature associated with the received database query.

Through such traversing, the received database query is successively classified and directed through the PQR tree until ultimately the received database query is classified to a particular leaf of the PQR tree. This allows for determining a rough estimate of the static execution time in the form of a time range estimate of static execution time that is based upon a similarity of at least one query feature to a historical query feature shared by a grouping of historical database queries stored in an element of the PQR tree. Consider for example, an embodiment where, based upon some query feature similarity, the received database query is ultimately classified to leaf 313 of PQR tree 230A. In such an embodiment, the estimated static execution time range has been successively narrowed from a very broad static execution time range associated with node 310 (0 to 6 seconds), to a narrower estimated static execution time range associated with node 305 (5 to 16 seconds), and finally to an even narrower static execution time range of associated with leaf 313 (7 to 16 seconds). The estimated static execution time range of seven to sixteen seconds associated with leaf 313 provides a rough estimate of the static execution time of the received database query, which has been successively narrowed by further traversing of PQR tree 230A. In some embodiments, such traversing could stop at node 305 or even at node 310 rather than proceeding to leaf 313, thus resulting in broader time range estimate. In one embodiment, such an estimated static execution time range is then output to a user, for example on a display device, such as display device 118 (FIG. 1). In other embodiments, this estimated static execution time range estimate is output to be used by another process, such as for use by a portion of a database system.

As previously described, through the use of a multiple linear regression function in a leaf element of the PQR tree, a particular static execution time for the database query can be determined (that is, a particular static execution time can be estimated rather than a range of estimated static times). It is appreciated that some prediction accuracy may be sacrificed in order to achieve a particular estimate of the static execution time. Thus, following the previous example, in one embodiment, either automatically or through a user initiated request, a multiple linear regression function of leaf element 313 is utilized to determine a particular static execution time for the received database query which has been classified into leaf 313. It is appreciated that this particular static execution time will be a time bounded by the range of execution times associated with leaf 313. Thus, in this example, the particular execution time may be a time such as 8.42 seconds, which is within the range of seven to sixteen seconds that is associated with leaf 313. Additionally, the accuracy associated with this particular execution time will be something less than the 85% accuracy associated with node 305. In one embodiment, this particular estimated static execution time is then output to a user, for example on a display device, such as display device 118 (FIG. 1). In another embodiment, this particular estimated static execution time is output to be used by another process, such as for use by a portion of a database system.

Although the subject matter of the present technology for estimating a static execution time of a database query has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for estimating a static execution time of a database query, said method comprising:

building a prediction of query runtime tree from historical query information at a computer system, said building comprising utilizing machine learning to build said prediction of query runtime tree such that node elements and leaf elements of said prediction of query runtime tree correspond to execution time ranges;

receiving a database query at said computer system; and utilizing said prediction of query runtime tree to estimate said static execution time of said database query at said computer system said utilizing comprising traversing said prediction of query runtime tree on the basis of at least one query feature associated with said database query, such that a time range estimate of said static execution time is associated with said database query based upon a similarity of said at least one query feature to a historical query feature shared by a grouping of historical database queries.

2. The method as recited in claim 1, wherein said utilizing machine learning to build said prediction of query runtime tree comprises:
    decomposing an historical database query of said historical query information into one or more historical query features.

3. The method as recited in claim 2, wherein said decomposing an historical database query of said historical query information into one or more historical query features comprises:
    decomposing said historical database query into said historical query feature, said historical query feature selected from the group of historical query features consisting of: an optimizer cost, a total number of operators, a total operator cost, a total operator cardinality, a total number of tables, a measure of bushiness of a query tree, a measure of process parallelism, a total number of joins, a total join cardinality, a total number of group-bys and sorts, a total cardinality of group-bys and sorts, a total number of input/outputs, a total input/output cardinality, and an accuracy of table statistics.

4. The method as recited in claim 1, wherein said building a prediction of query runtime tree from historical query information comprises:
    grouping an historical database query of said historical query information into an element of a binary decision tree based upon an execution time of said historical database query; and
    terminating construction of said element based upon a pre-defined termination condition.

5. The method as recited in claim 4, wherein said terminating construction of an element of said prediction of query runtime tree based upon a pre-defined termination condition comprises:
    terminating construction of said element of said prediction of query runtime tree upon satisfying a termination condition from the group of termination conditions consisting of: dropping below a predetermined time range threshold for said element; dropping below a predetermined threshold number of historical database queries grouped in said element; and dropping below a predetermined accuracy of time estimation for said element.

6. The method as recited in claim 1, wherein said building a prediction of query runtime tree from historical query information comprises:
    including a decision making function in a node element of said prediction of query runtime tree, said decision making function for classifying said database query into one of two leaves coupled with said node.

7. The method as recited in claim 1, wherein said building a prediction of query runtime tree from historical query information comprises:
    including a multiple linear regression function in a leaf element of said prediction of query runtime tree, said multiple linear regression function for determining said static execution time for said database query.

8. The method as recited in claim 1, wherein said utilizing said prediction of query runtime tree to estimate said static execution time of said database query comprises:
    decomposing said database query into one or more query features.

9. A computer-readable medium having computer-executable instructions for performing a method for utilizing historical query information to estimate a static execution time of database query:
    receiving a database query;
    accessing a prediction of query runtime tree built from historical query information; and
    processing said database query through said prediction of query runtime tree to estimate a static execution runtime of said database query based upon historical information pertaining to historical database queries similar to said database query, said processing comprising traversing said prediction of query runtime tree on the basis of at least one query feature associated with said database query, said traversing comprising determining a time range estimate of said static execution time based upon a similarity of said at least one query feature to a historical query feature shared by a grouping of historical database queries stored in an element of said prediction runtime query tree.

10. The computer-readable medium of claim 9, wherein said accessing a prediction of query runtime tree comprises:
    accessing an initial node of a binary decision tree, said initial node corresponding to an overall range of historical execution times associated with plurality of historical database queries of said historical information.

11. The computer-readable medium of claim 9, wherein said processing said database query through said prediction of query runtime tree to estimate a static execution runtime of said query based upon historical information pertaining to execution times of similar queries to said database query comprises:
    decomposing said database query into one or more query features.

12. The computer-readable medium of claim 11, wherein said decomposing said database query into one or more query features comprises:
    decomposing said database query into a query feature selected from the group of query features consisting of: an optimizer cost, a total number of operators, a total operator cost, a total operator cardinality, a total number of tables, a measure of bushiness of a query tree, a measure of process parallelism, a total number of joins, a total join cardinality, a total number of group-bys and sorts, a total cardinality of group-bys and sorts, a total number of input/outputs, a total input/output cardinality, and an accuracy of table statistics.

13. The computer-readable medium of claim 9, wherein said traversing said prediction of query runtime tree on the basis of at least one query feature associated with said database query comprises:
    utilizing a multiple linear regression function in a leaf element of said prediction of query runtime tree to determine said static execution time for said database query.

* * * * *

UNITED STATES PATENT AND TRADEMARK OFFICE
CERTIFICATE OF CORRECTION

| | | |
|---|---|---|
| PATENT NO. | : 7,831,594 B2 | Page 1 of 1 |
| APPLICATION NO. | : 11/799141 | |
| DATED | : November 9, 2010 | |
| INVENTOR(S) | : Abhay Mehta et al. | |

It is certified that error appears in the above-identified patent and that said Letters Patent is hereby corrected as shown below:

On the title page, in item (73), Assignee, in column 1, line 2, delete "L.L.P.," and insert -- L.P., --, therefor.

Signed and Sealed this
Twenty-fourth Day of May, 2011

David J. Kappos
*Director of the United States Patent and Trademark Office*